United States Patent
Hsieh

Patent Number: 5,674,036
Date of Patent: Oct. 7, 1997

[54] SCREW

[76] Inventor: Chih-Ching Hsieh, No. 64. Lane 107, Liang Tsun Rd., Fong Yuan City, Taichung Hsien, Taiwan

[21] Appl. No.: 575,634

[22] Filed: Dec. 20, 1995

[51] Int. Cl.$^6$ .................................................. F16B 23/00
[52] U.S. Cl. ........................................ 411/410; 411/402
[58] Field of Search ................................ 411/402, 403, 411/404, 406, 407, 410, 919, 84, 85

[56] References Cited

U.S. PATENT DOCUMENTS

| | | | |
|---|---|---|---|
| 2,248,695 | 7/1941 | Bradshaw | 411/919 |
| 2,448,213 | 8/1948 | Doonan | 411/403 |
| 3,134,292 | 5/1964 | Walton | 411/919 |
| 4,384,812 | 5/1983 | Miyagawa | 411/410 |
| 4,444,301 | 4/1984 | Granberry | 411/410 |
| 4,459,074 | 7/1984 | Capuano | 411/410 |
| 5,137,407 | 8/1992 | Yamamoto | 411/919 |
| 5,401,133 | 3/1995 | Kuchler | 411/402 |

FOREIGN PATENT DOCUMENTS 2098693  11/1982  United Kingdom .................. 411/410

OTHER PUBLICATIONS

*UNBRAKO Metric Socket Screws*, 1975 Catalog, All Pages.

Primary Examiner—Steven N. Meyers
Assistant Examiner—Gary Estremsky
Attorney, Agent, or Firm—Varndell Legal Group

[57] ABSTRACT

A screw having a tool slot in the upper surface of its head, wherein the tool slot is defined by a plurality of circularly arched upright grooves and a plurality of flat upright wall portions, which are alternatively arranged around the border of the tool slot for permitting a hex wrench and a grooved wrench to be alternatively fitted into the tool slot and driven to turn the screw; the head is made of oval shape having smoothly curved side wall portions and flat side wall portions alternatively arranged together and adapted for turning by open-end wrenches of different sizes.

2 Claims, 7 Drawing Sheets

SCREW

BACKGROUND AND SUMMARY OF THE INVENTION

The invention concerns a screw with an oval head adapted for turning by different open-end wrenches, and with a tool slot in the upper surface of its head adapted for turning by a hex wrench or an Allen wrench.

On a large scale, screws are being used instead of nails, to fasten things together. A screw may have a head for easy turning by an open-end wrench, with a tool slot in the upper surface of the head adapted for turning by a screwdriver, grooved wrench, hex wrench, or socket wrench. However, the tool slots of regular screws are designed to be adapted for turning by a particular tool of a particular size only. Therefore, when to turn a particular screw, one shall have to find a particular tool of a particular size from different tools of different sizes for turning the screw.

It is the major object of the present invention to provide a screw which is designed for turning by any of a variety of tools of different sizes According to one aspect of the present invention, the tool slot of the screw is defined by a plurality of circularly arched upright grooves and a plurality of flat upright wall portions, which are alternatively arranged around the border of the tool slot for permitting a hex wrench and a grooved wrench to be alternatively fitted into the tool slot and driven to turn the screw. Accordingly to another aspect of the present invention, the head of the screw is made of oval shape having smoothly curved side wall portions and flot side wall portions alternatively arranged together and adapted for turning by open-end wrenches of different sizes.

DETAILED DESCRIPTION OF THE PREFERRED EMBODIMENT

Figure 2:
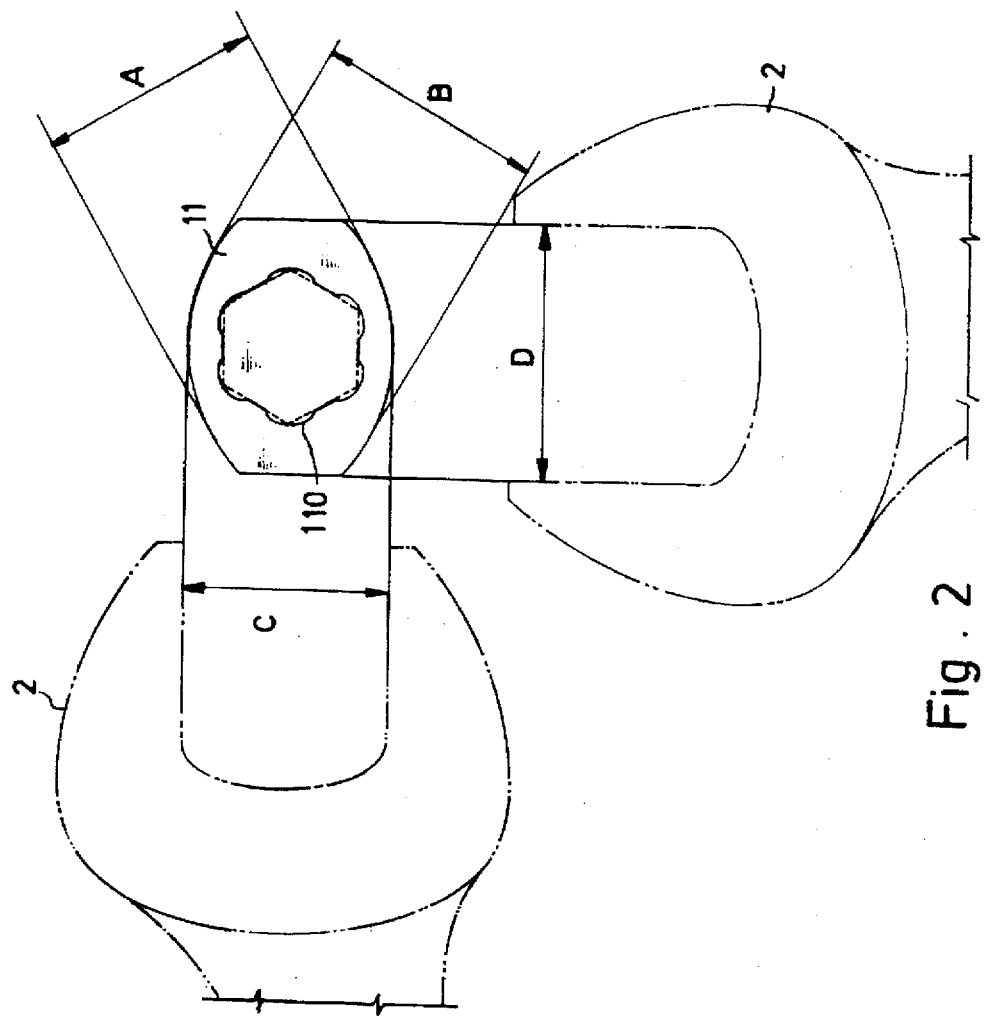
FIG. 2 is a schematic drawing showing different open-end wrenches attached to the head of the screw in different directions according to the present invention.
Figure 1:
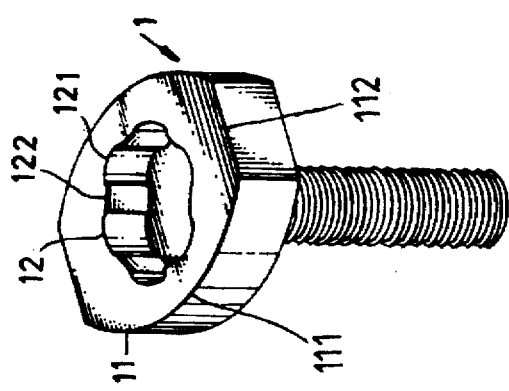
FIG. 1 is an elevational view of a screw according to the present invention.
Figure 7:
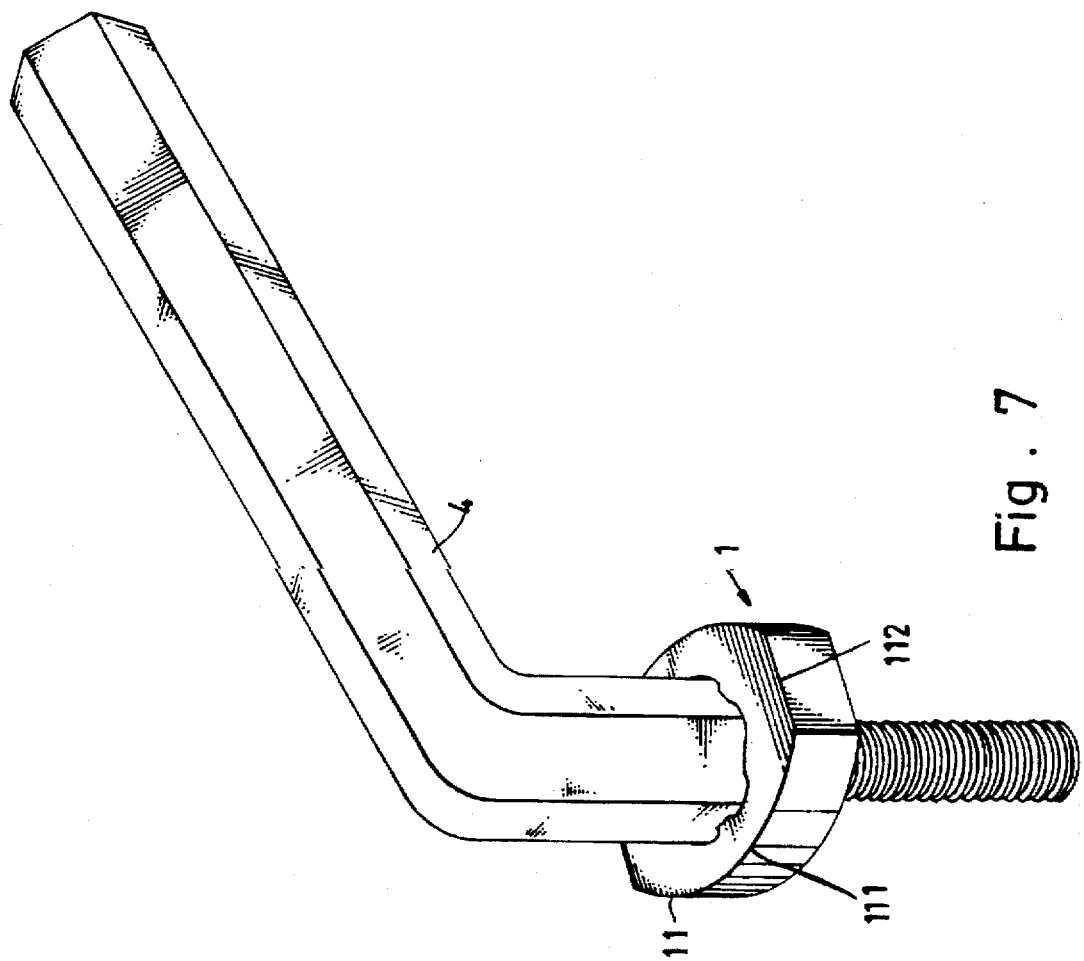
FIG. 7 shows a hex wrench attached to the tool slot of the screw shown in FIG. 1.
Figure 8:
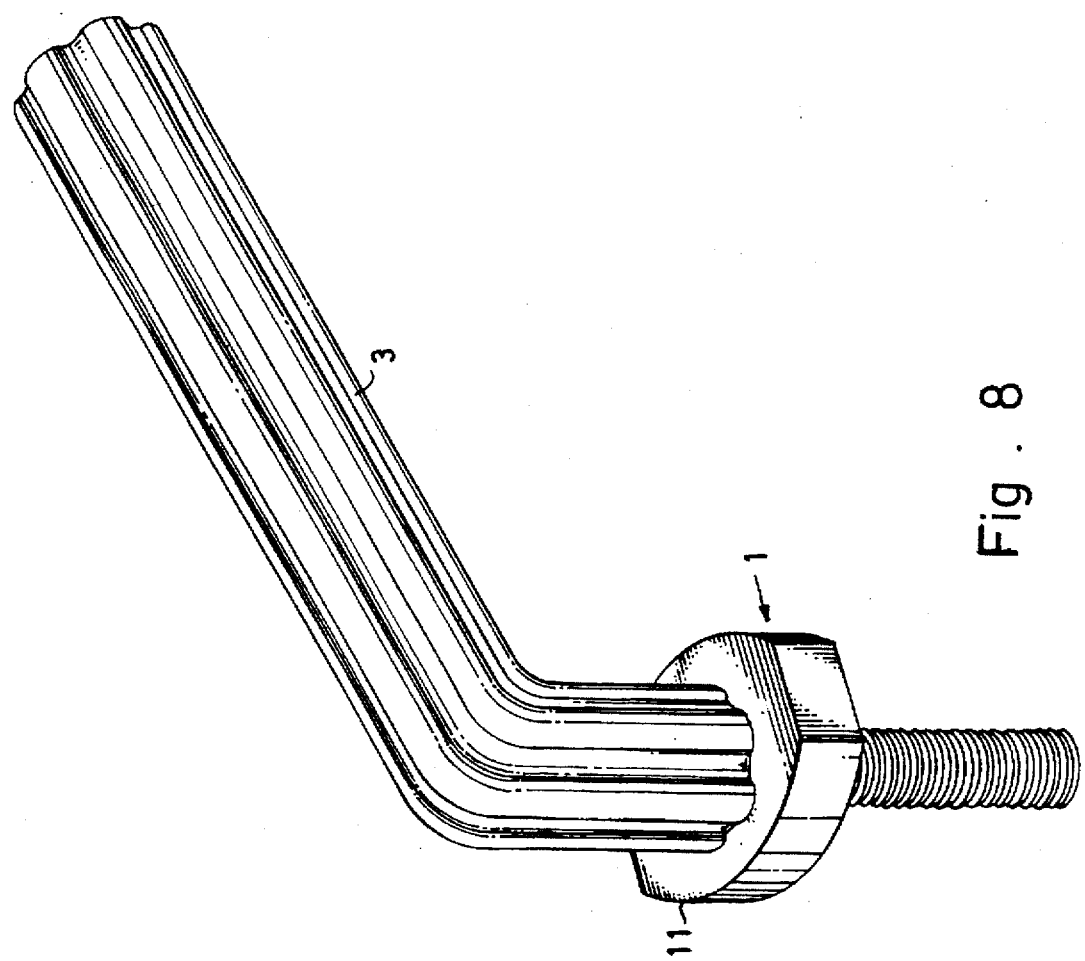
FIG. 8 shows a grooved wrench attached to the tool slot of the screw shown in FIG. 1.
Figure 9:
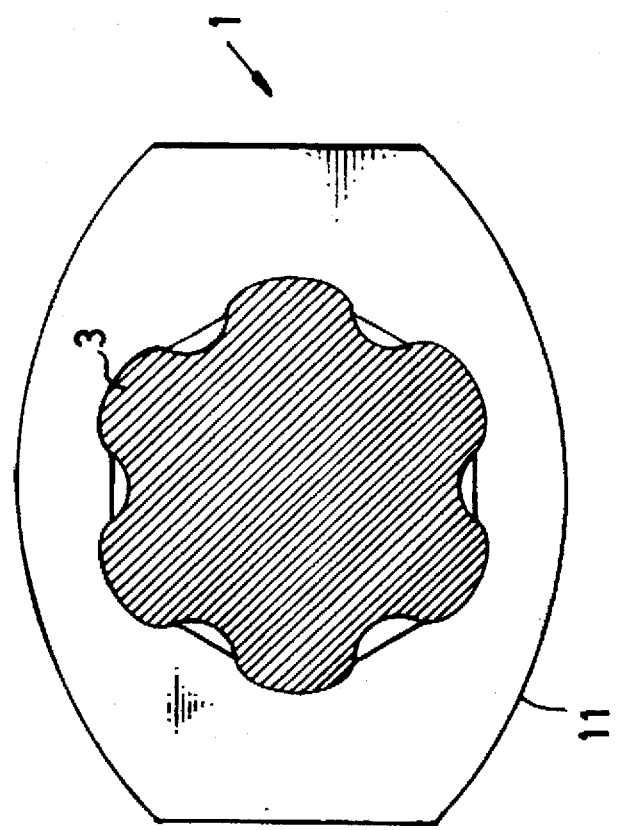
FIG. 9 is a cross section taken on a part of FIG. 8, showing the grooved wrench fitted into the tool slot.

Referring to FIGS. 1 and 2, the screw, referenced by 1, has an oval-like head 11 adapted for turning by any of a variety of open-end wrenches 2 of different specifications. The oval-like head 11 has smoothly curved side wall portions 111 and flat side wall portions 112 alternatively arranged together to fit the open ends of open-end wrenches 2 of different sizes. FIG. 2 shows four open-end wrenches 2 of different sizes A, B, C, and D used for turning the oval-like head 11 of the screw 1. A tool slot 12 is made in the upper surface of the oval-like head 11. The tool slot 12 comprises a plurality of circularly arched upright grooves 121 and a plurality of flat upright wall portions 122 alternatively arranged around the border. Therefore, a hex wrench 4 (see FIG. 7) or a grooved wrench 3 (see FIGS. 8 and 9) can be fitted into the tool slot 12 to turn the screw 1.

Figure 4:
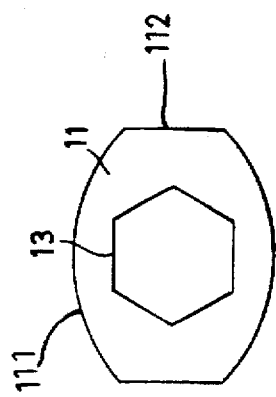
FIG. 4 is a top plain view of the head of the screw shown in FIG. 3.
Figure 5:
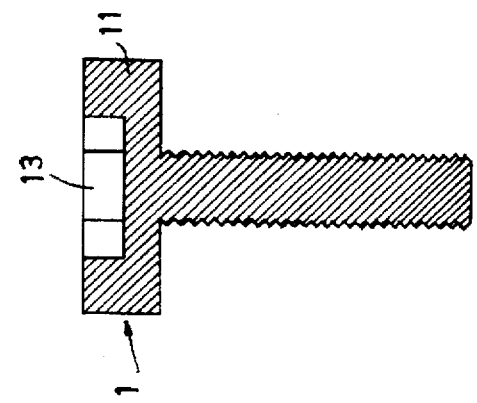
FIG. 5 is a side view in section of the screw shown in FIG. 3.
Figure 3:
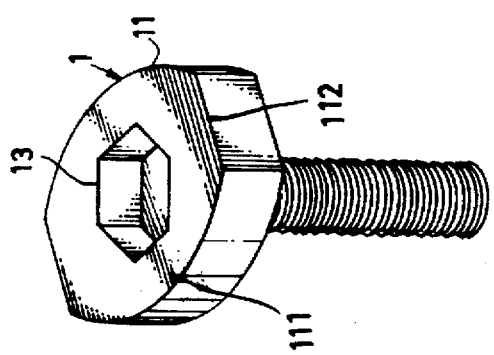
FIG. 3 is an elevational view of alternate form of the screw according to the present invention, showing a hexagonal tool slot made in the upper surface of the head of the screw.

FIGS. 3, 4, and 5 show an alternate form of the present invention, in which a hexagonal screwdriver slot 13 is made in the upper surface of the oval-like head 11 for turning by a socket wrench.

Figure 10:
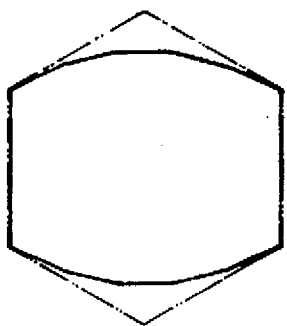
FIG. 10 shows an alternate arrangement of the head of the screw according to the present invention.

As an another alternate form of the present invention, as shown in FIG. 10, the head of the screw may be made of polygonal profile.

Figure 6:
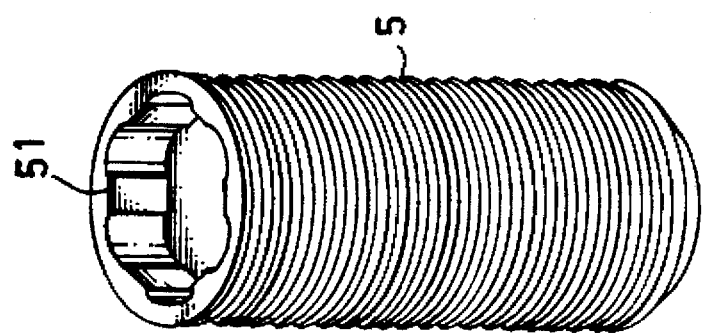
FIG. 6 shows another alternate form of the screw according to the present invention.

FIG. 6 shows still another alternate form of the present invention, in which the screw is developed as a countersunk screw 5 having a tool slot 51 in one end thereof for turning by a hex wrench or a grooved wrench.

It is to be understood that the drawings are designed for purposes of illustration only, and are not intended as a definition of the limits and scope of the invention disclosed.

I claim:

1. A screw comprising a head having a flat top with a center and solid sides transversely extending downward relative to said top, said sides including first, second, third and fourth sides; said first side opposing said third side, said second side opposing said fourth side, said first and third sides are symmetrical about said center of said top; said second and said fourth sides are equal in length, parallel and rectangular-shaped flat walls; said first side having a peripheral shape of a partial circle when viewed from said top and a radius of said partial circle is longer than said length of said second and fourth sides; said first, second, third and fourth sides arranged to cooperate with open-end wrenches for at least three different sized nuts for turning said screw.

2. The screw of claim 1, further including a tool slot arranged at said center of said top, said tool slot including a plurality of sides extending downward relative to said top, said plurality of sides including six rectangular-shaped flat walls arranged in a hexagonal pattern when viewed from said top, and six convex walls relative to said center arranged at corners of said hexagonal pattern when viewed from said top.

* * * * *